United States Patent [19]
Van Der Hoven et al.

[11] Patent Number: 6,164,007
[45] Date of Patent: *Dec. 26, 2000

[54] FISH HOOK

[76] Inventors: Nicolaas Phillipus Jacobus Van Der Hoven; Henry Justus Herman Van Der Hoven, both of 51 Klaassens Road, Constantia 7800, South Africa

[*] Notice: This patent is subject to a terminal disclaimer.

[21] Appl. No.: 09/106,548

[22] Filed: Jun. 29, 1998

Related U.S. Application Data

[63] Continuation of application No. 08/700,444, Aug. 19, 1996, Pat. No. 5,953,851.

[30] Foreign Application Priority Data

Feb. 22, 1994 [ZA] South Africa .......................... 94/1203

[51] Int. Cl.[7] ................................................ A01K 83/00
[52] U.S. Cl. ................................................ 43/43.4; 43/37
[58] Field of Search .......................... 43/37, 42.43, 43.4, 43/43.6, 43.16

[56] References Cited

U.S. PATENT DOCUMENTS

| | | | |
|---|---|---|---|
| 379,080 | 3/1888 | Rice ........................................ 43/42.43 |
| 983,353 | 2/1911 | Doddridge ................................ 43/43.4 |
| 2,123,598 | 7/1938 | Eliason ...................................... 43/43.4 |
| 2,176,820 | 10/1939 | McConnell ................................. 43/37 |
| 2,234,516 | 3/1941 | Clark ........................................ 43/43.6 |
| 2,424,599 | 7/1947 | Burns ........................................ 43/43.4 |
| 2,629,959 | 3/1953 | Dalton . |
| 2,664,662 | 1/1954 | Lason ........................................ 43/43.4 |
| 2,785,498 | 3/1957 | Youngquist et al. . |
| 2,924,482 | 2/1960 | Gibson . |
| 2,948,985 | 8/1960 | Kinzer . |
| 2,996,828 | 8/1961 | Williams, Jr. . |
| 3,231,999 | 2/1966 | Gurka . |
| 3,357,125 | 12/1967 | Jester . |
| 4,177,595 | 12/1979 | Chon ........................................ 43/2.12 |
| 4,926,579 | 5/1990 | Jimenez ................................... 43/42.44 |

*Primary Examiner*—Kurt Rowan
*Attorney, Agent, or Firm*—Baker Botts, L.L.P.

[57] ABSTRACT

A fish hook comprises a shank 12 terminating at one end in a barbed hook formation 14 and at the other end in a head 16. A hook-closing element 18 which is of resiliently flexible steel wire is mounted on the head 16 and is displaceable between a retracted position in which it lies adjacent the shank, and an extended position in which it extends across the gap between the shank and the tip of the hook formation. A detent pin 28 holds the hook-closing element in the retracted position. When the detent pin is pulled, the hook-closing element is released so that it moves, under action of its bias, from the retracted to the extended position.

11 Claims, 2 Drawing Sheets

FISH HOOK

This application is a continuation of application Ser. No. 08/700,444, filed Aug. 19, 1996 entitled FISH HOOK, now U.S. Pat. No. 5,953,857.

THIS INVENTION relates to a fish hook.

The term "fish hook" in this specification is used in a broad sense and should be interpreted as including also a gaff and other fishing accessories having a hook whereby a fish can be hooked.

According to the invention there is provided a fish hook comprising a shank which terminates at one end in a hook formation and at the other end in a shank head, a hook-closing element which is displaceable between a retracted position in which it lies adjacent the shank and an extended position in which it extends across the gap between the shank and the tip of the hook formation, and a detent mounted on the shank head so as to be slidably displaceable with respect to the shank in the longitudinal direction of the shank, between a first position in which it acts to hold the hook-closing element in the retracted position, and a second position in which it releases the hook-closing element for displacement to the extended position.

The hook-closing element may be resiliently biased towards the extended position.

The detent may be provided with an eye for use in securing the fish hook to a fishing line. With this arrangement, when a fish pulls on the hook, the tension in the fishing line will be effective to displace the detent from the first position to the second position, thus releasing the hook-closing element for displacement from the retracted position to the extended position.

The eye may be in the form of a ring which passes through a transversely extending opening in the detent. There may also be a transverse opening in the shank head, the ring passing through the transverse opening in the shank head as well. The transverse opening in the shank head should be large enough to permit slidable displacement of the detent between the first and second positions without interference. With this arrangement the ring will serve to hold the detent captive with respect to the shank head.

The shank may have a recess therein in which the hook-closing element is at least partly accommodated when in the retracted position.

The hook-closing element may be in the form of a length of spring steel wire which has a hairpin bend therein, to form the hook-closing element with a limb on each opposite side of the bend, the end of each limb being bent through right angles so that the two ends extend towards one another, the two ends being offset with respect to one another, and each of the ends entering in a corresponding hole in the shank head.

One of the limbs of the hook-closing element may have a transversely extending portion, the arrangement being such that when the detent is in the first position it is capable of engaging with the transversely extending portion to hold the hook-closing element in the retracted position.

The shank head may be provided with a shoulder whose arrangement is such that, when the hook-closing element is in the extended position, said transversely extending portion abuts on the shoulder.

The invention will now be described in more detail, by way of example, with reference to the accompanying drawings.

IN THE DRAWINGS

Figure 1:
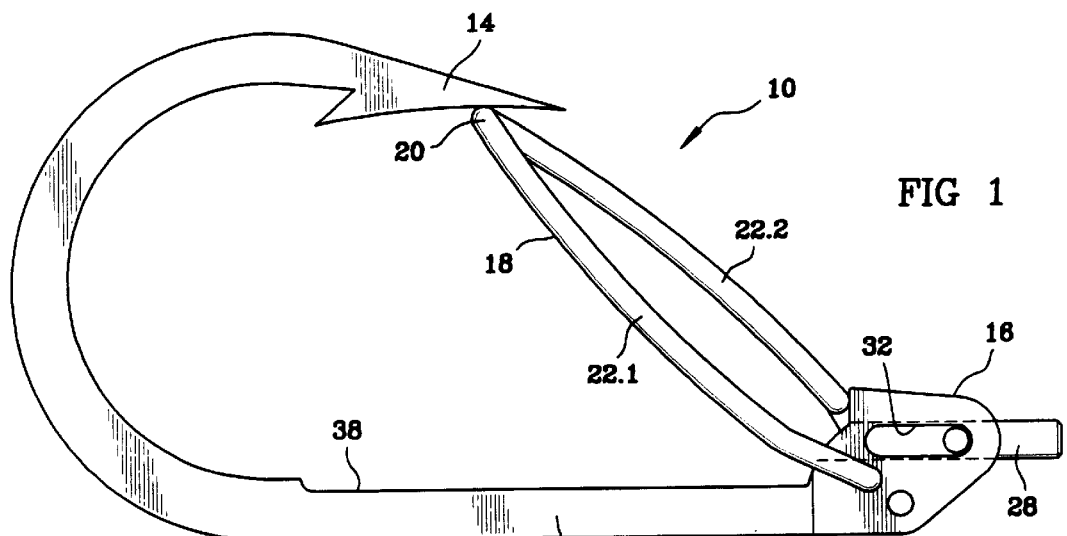
FIG. 1 is a side view of a fish hook in accordance with the invention, being shown in its triggered condition.

Referring now to the drawings in more detail, reference numeral 10 generally indicates a fish hook which comprises a shank 12 which terminates at one end in a barbed hook formation 14. At the end opposite the hook formation 14, the shank 12 has a head 16.

Figure 3:
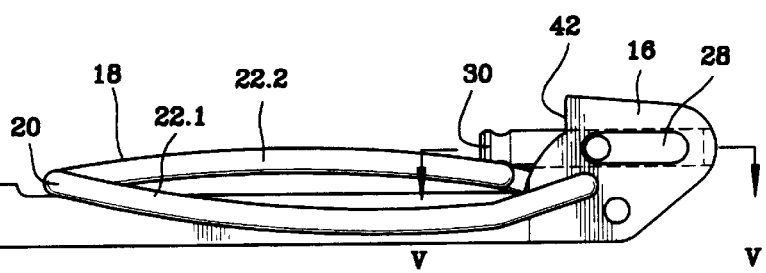
FIG. 3 is a view in the direction of arrow III in FIG. 2.
Figure 3:
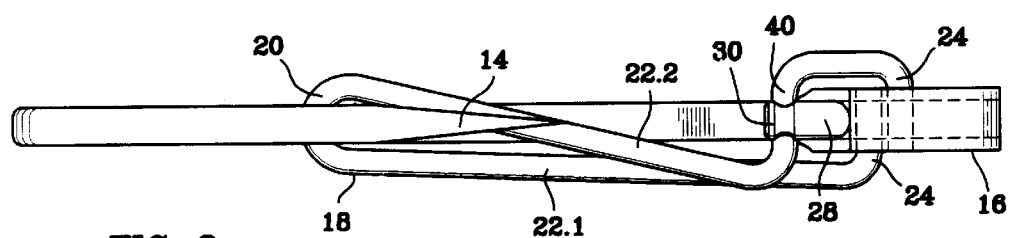
Figure 4:
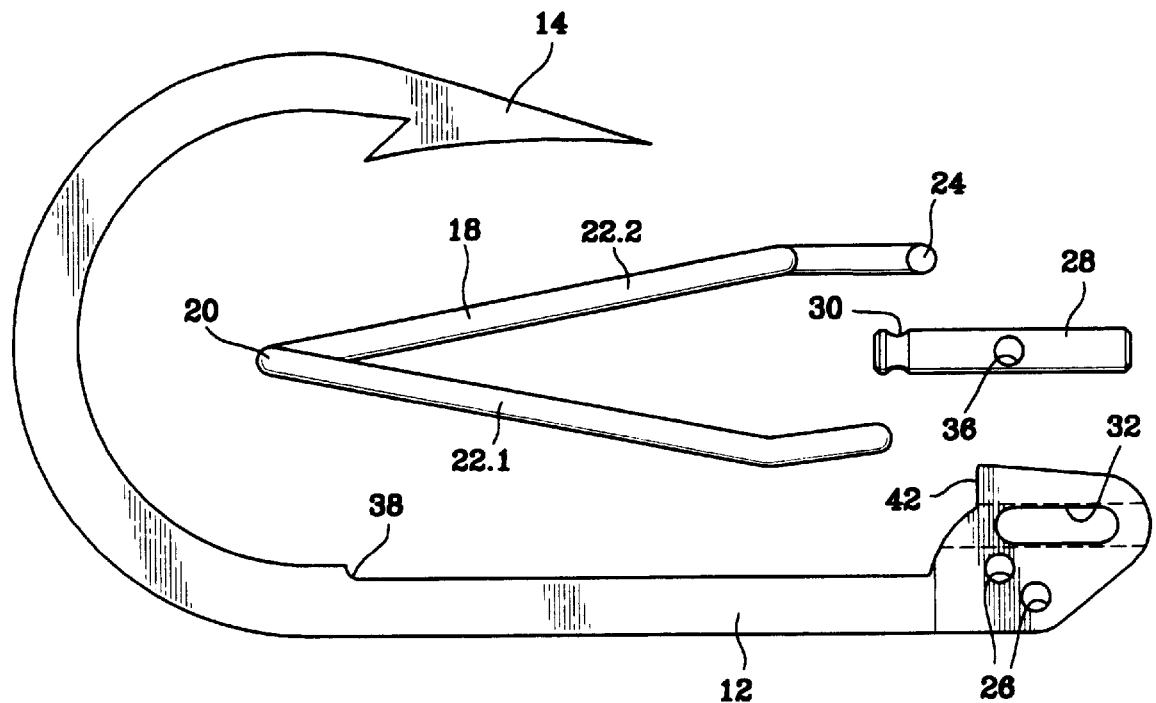
FIG. 4 shows the various component parts of the fish hook, in a disassembled condition.
Figure 5:
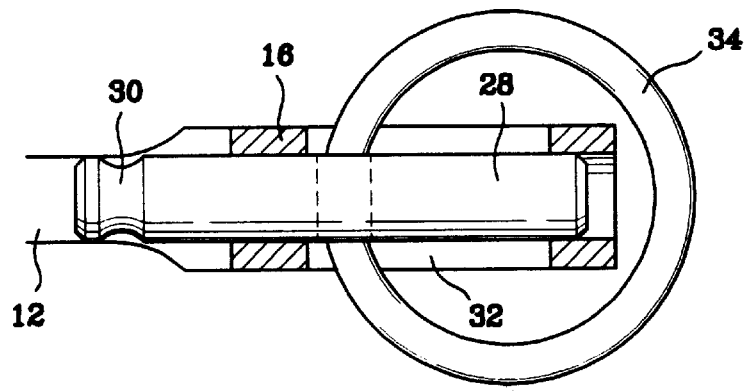
FIG. 5 is a detail section on V—V in FIG. 2.

As can best be seen in FIG. 3, the thickness of the material from which the shank 12, the hook formation 14, and the shank head 16 is made is greater in the region of the head 16 than it is in the region of the shank 12 and hook formation 14.

The fish hook 10 further comprises a hook-closing element 18 which is in the form of a length of resiliently flexible stainless steel wire which has a hairpin bend therein at 20, to form the hook-closing element with limbs 22.1 and 22.2 on opposite sides of the bend. Each limb 22.1, 22.2 has the free end 24 thereof bent through right angles, the ends extending towards one another and being offset with respect to one another. Each of the ends 24 is received in a corresponding transversely extending hole 26 in the shank head 16. When the hook-closing element 18 is in the position illustrated in FIGS. 2 and 3 it is in a strained condition, urging the end 20 thereof towards the tip of the hook formation 14.

The fish hook 10 further comprises a detent which is in the form of a pin 28 having a grooved head 30. The detent pin 28 is a sliding fit in a longitudinally extending hole in the shank head 16, ie extending in a direction which is in line with the shank 12. The pin 28 crosses a slotted opening 32 in the shank head 16. A ring 34 (not shown in FIGS. 1 to 4) is fitted to the pin 28, the ring passing through an opening 36 in the pin and through the opening 32. The ring 34 serves to keep the pin 28 captive with respect to the shank head 16 and also serves as an eye by means of which the fish hook can be tied to the end of a fishing line.

Figure 2:
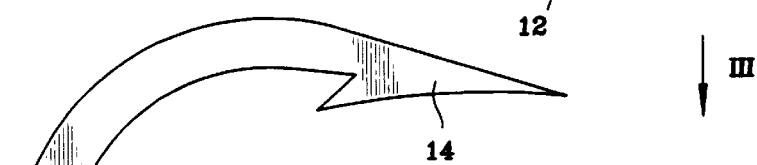
FIG. 2 is a side view of the fish hook when in its set condition.

The pin 28 is slidable between a first position as illustrated in FIGS. 2 and 3, in which the head 30 holds the hook-closing element 18 in the retracted position, and a second position as illustrated in FIG. 1, in which it releases the hook-closing element for displacement to the extended position.

It will be seen that the shank 12 has a recess 38 therein, in which the hook-closing element 18 is accommodated when in the retracted position.

In use, the fish hook 10 is secured to a fishing line via the eye 34. The hook-closing element 18 is moved to the retracted position as illustrated in FIG. 2 and 3, and the pin 28 slid to the position illustrated in FIGS. 2 and 3. In this position the pin 28 holds the hook-closing element in the retracted position. A transversely extending part 40 of the limb 22.2 seats in the groove of the head 30, to offer a certain degree of resistance to movement of the pin 28 from the position illustrated in FIGS. 2 and 3.

The head 16 has a shoulder 42 whose arrangement is such that the part 40 of the limb 22.2 abuts on the shoulder when the hook-closing element 18 is in the extended position as illustrated in FIG. 1. This will act as an end stop for the hook-closing element, to prevent or limit pressure exerted by the end 20 on the hook formation 14.

The effect of a fish biting and pulling on the hook 10 will be to cause the pin 28 to move from the position illustrated in FIGS. 2 and 3 to the position illustrated in FIG. 1, thereby releasing the hook-closing element 18. This causes the hook-closing element 18, under action of its resilient bias, to move to the extended position illustrated in FIG. 1, making it difficult if not impossible for the fish to shake loose.

In the case of a gaff, in which the shank 12 will be connected to the shaft of the gaff, a part corresponding to the shank 12 will be slidable with respect to the shaft, and a part corresponding to the pin 28 (ie the detent) will be fixed to the shaft.

What is claimed is:

1. A fish hook comprising:

a longitudinally extending shank a hook formation at one end of the shank terminating in a tip and having a gap between the shank and the tip;

a shank head at the other end of the shank having a longitudinally extending passage there through;

a hook-closing element having a mounted end and a free end remote from the mounted end wherein the hook-closing element is displaceable between a retracted position that lies adjacent to the shank and an extended position that extends across the gap; and a detent for the hook-closing element which is slidably displaceable along said passage between a first position, which acts to hold the hook-closing element in the retracted position, and a second position in which the detent releases the hook-closing element for displacement to the extended position, and wherein the detent comprises an eye for use in securing the fish hook to a fishing line and wherein the eye is in the form of a ring which passes through a transversely extended opening in the detent;

wherein the hook-closing element has an abutment on which the detent acts when holding the hook-closing element in the retracted position, and said abutment is between the free end and the mounted end of the hook-closing element, and spaced from the free end.

2. The fish hook of claim 1, further comprising a transverse opening in the shank head wherein the ring passes through said transverse opening.

3. A fish hook comprising:

a longitudinally extending shank a hook formation at one end of the shank terminating in a tip and having a gap between the shank and the tip;

a shank head at the other end of the shank having a longitudinally extending passage there through;

a hook-closing element having a mounted end and a free end remote from the mounted end wherein the hook-closing element is displaceable between a retracted position that lies adjacent to the shank and an extended position that extends across the gap; and a detent for the hook-closing element which is slidably displaceable along said passage between a first position, which acts to hold the hook-closing element in the retracted position, and a second position in which the detent releases the hook-closing element for displacement to the extended position;

wherein the hook-closing element has an abutment on which the detent acts when holding the hook-closing element in the retracted position, and said abutment is between the free end and the mounted end of the hook-closing element, and spaced from the free end, and wherein the hook-closing element is in the form of a length of spring steel wire which has a hairpin bend that forms the hook-closing element with a limb on each opposite side of the bend, the end of each limb being bent through right angles so that the two ends extend towards one another, the two ends being offset with respect to one another, and each of the ends entering in a corresponding hole in the shank head.

4. The fish hook of claim 3, wherein the hook-closing element is resiliently biased towards the extended position.

5. The fish hook of claim 3 wherein the detent comprises an eye for use in securing the fish hook to a fishing line.

6. The fish hook of claim 3 wherein the shank contains a recess in which the hook-closing element is at least partly accommodated when in the retracted position.

7. The fish hook of claim 3 wherein the abutment is formed by a transversely extending portion of one of the limbs.

8. The fish hook of claim 7 wherein the shank head comprises a shoulder such that, when the hook-closing element is in the extended position, said transversely extending portion abuts on the shoulder.

9. A fish hook comprising:

a longitudinally extending shank;

a hook formation at one end of the shank that terminates in a tip wherein there is a gap between the shank and the tip;

a shank head at the other end of the shank having a longitudinally extending passage in the shank head;

a hook-closing element having a mounted end and a free end remote from the mounted end, wherein the hook-closing element is displaceable between a retracted position, in which the hook-closing element lies along and adjacent the shank, and an extended position in which the hook-closing element extends across said gap; and a detent for the hook-closing element that is slidably displaceable along said passage between a first position, in which the detent acts to hold the hook-closing element in the retracted position, and a second position in which the detent releases the hook-closing element for displacement to the extended position, and wherein the detent comprises an eye for use in securing the fish hook to a fishing line and wherein the eye is in the form of a ring which passes through a transversely extended opening in the detent;

the hook-closing element having an abutment on which the detent acts when holding the hook-closing element in the retracted position;

the mounted end of the hook-closing element being at or near the shank head; and the hook-closing element, when in the retracted position, extending from the shank head along the shank towards said one end of the shank.

10. A fish hook comprising a shank that terminates at one end in a hook formation and at the other end in a shank head, further comprising a hook-closing element that is displaceable between a retracted position, wherein said hook-closing element lies adjacent to the shank, and an extended position wherein said hook-closing element extends across the gap between the shank and the tip of the hook formation, and a detent mounted on the shank head so as to be slidably displaceable with respect to the shank in the longitudinal direction of the shank, between a first position wherein said detent acts to hold the hook-closing element in the retracted position, and a second position wherein said detent acts to release the hook-closing element for displacement to the extended position, wherein the detent is provided with an eye for use in securing the fish hook to a fishing line and the eye is in the form of a ring that passes through a transversely extending opening in the detent.

11. The fish hook of claim 10 further comprising a transverse opening in the shank head and said ring passes through said transverse opening.

* * * * *